United States Patent
Kan et al.

(10) Patent No.: US 10,073,561 B2
(45) Date of Patent: Sep. 11, 2018

(54) TOUCH APPARATUS AND CORRECTION METHOD THEREOF

(71) Applicant: Wistron Corporation, New Taipei (TW)

(72) Inventors: Wei-Kuo Kan, New Taipei (TW); Kuo-Ting Huang, New Taipei (TW); Yu-Yen Chen, New Taipei (TW); Chia-Ta Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 230 days.

(21) Appl. No.: 14/805,477

(22) Filed: Jul. 22, 2015

(65) Prior Publication Data

US 2016/0110019 A1    Apr. 21, 2016

(30) Foreign Application Priority Data

Oct. 17, 2014   (TW) .............................. 103136026 A

(51) Int. Cl.
*G06F 3/041*    (2006.01)
*G06F 3/042*    (2006.01)

(52) U.S. Cl.
CPC ............ *G06F 3/0418* (2013.01); *G06F 3/042* (2013.01)

(58) Field of Classification Search
CPC ................................ G06F 3/0418; G06F 3/042
USPC ........................................................ 345/178
See application file for complete search history.

(56) References Cited

U.S. PATENT DOCUMENTS

| | | | | |
|---|---|---|---|---|
| 6,262,718 B1 * | 7/2001 | Findlay | ................. | G06F 3/0418 345/173 |
| 6,353,434 B1 * | 3/2002 | Akebi | .................... | G06F 3/0418 345/173 |
| 6,977,646 B1 * | 12/2005 | Hauck | ................... | G06F 3/0418 345/173 |
| 7,327,353 B2 * | 2/2008 | Wang | .................... | G06F 3/0418 345/173 |
| 8,373,680 B2 | 2/2013 | Chen et al. | | |
| 8,456,418 B2 * | 6/2013 | Ung | ...................... | G06F 3/0421 345/158 |
| 8,462,137 B2 | 6/2013 | Lin et al. | | |
| 2002/0070926 A1 * | 6/2002 | Kavanagh | ............. | G06F 3/0418 345/173 |
| 2009/0066674 A1 * | 3/2009 | Maharyta | ............ | G06F 3/03547 345/178 |
| 2012/0235956 A1 * | 9/2012 | Wang | .................... | G06F 3/0421 345/175 |

* cited by examiner

*Primary Examiner* — Benyam Ketema
(74) *Attorney, Agent, or Firm* — JCIPRNET

(57) ABSTRACT

A touch apparatus and a correction method thereof are provided. Whether to divide a correction block is determined by calculating distortion error quantity of the correction block, so as to make the distortion error quantity of each divided correction block is less than or equal to a preset threshold. A correction parameter set of each correction block is obtained. Accordingly, in an operation procedure, correction for a touch behavior of a user is executed based on the correction parameter set.

20 Claims, 6 Drawing Sheets

TOUCH APPARATUS AND CORRECTION METHOD THEREOF

CROSS-REFERENCE TO RELATED APPLICATION

This application claims the priority benefit of Taiwan application serial no. 103136026, filed on Oct. 17, 2014. The entirety of the above-mentioned patent application is hereby incorporated by reference herein and made a part of this specification.

BACKGROUND OF THE INVENTION

Field of the Invention

The invention relates to a touch system, and more particularly to a touch apparatus and a correction method thereof.

Description of Related Art

In recent years, touch electronic products have been very popular with consumers and have gradually become the mainstream in the market due to easy operation and highly intuitive mechanism. Currently, according to difference in structure and sensing manner, touch panels are mainly classified into resistive touch panels, capacitive touch panels, sound wave touch panels, optical touch panels, electromagnetic touch panels, etc. Among them, optical touch panels have advantages such as low cost and good accuracy, and thus has gained superiority in the competitive market. Today, they have also become the predominant choice for large-size touch screens.

An optical touch panel works as follows. A plurality of optical lenses are disposed at an edge of a screen, configured to capture an image of operation performed by a user's finger on the screen. Then, a position in a captured image where a shadow is cast by the finger that blocks light is analyzed, so as to obtain a relative angle between a touch point touched by the finger and the optical lenses. Finally, according to a known distance between the optical lenses, a system position corresponding to the touch point is calculated by a triangulation method. However, the optical touch panel has a problem in that a touch position and the system position may not match due to positional deviation of the optical lenses.

SUMMARY OF THE INVENTION

The invention provides a correction method, by which a touch apparatus reduces an error in converting a touch position into a system position.

The correction method of the invention is adapted for a touch apparatus. The correction method includes the following steps. A plurality of correction touches performed by a user within a correction block are detected, and thereby, distortion error quantity of the correction block is calculated. Whether the distortion error quantity is more than a preset threshold is determined. If the distortion error quantity is more than the preset threshold, the correction block is divided into a plurality of divided correction blocks. Then, the correction touches performed by the user within each of the divided correction blocks is re-detected, and thereby, the distortion error quantity of each divided correction block is calculated. If the distortion error quantity is less than or equal to the preset threshold, a correction parameter set of the correction block is obtained, so that correction for a touch behavior of the user is executed based on the correction parameter set.

In an embodiment of the invention, the step of detecting the correction touches performed by the user within the correction block and thereby calculating the distortion error quantity of the correction block includes the following steps. The correction touches performed by the user within the correction block are detected, and thereby, a plurality of correction coordinate positions are obtained. The correction coordinate positions are separately compared with a plurality of preset coordinate positions, and thereby, the distortion error quantity is calculated, wherein the correction block is a block surrounded by the preset coordinate positions.

In an embodiment of the invention, the distortion error quantity includes a first error degree value and a second error degree value, and the correction parameter set includes a plurality of first deviation values and a plurality of second deviation values. The step of separately comparing the correction coordinate positions with the preset coordinate positions and thereby calculating the distortion error quantity includes the following steps. The first deviation values in a first direction between the correction coordinate positions and the preset coordinate positions are separately calculated. The second deviation values in a second direction between the correction coordinate positions and the preset coordinate positions are separately calculated. The first error degree value is obtained based on the first deviation values. The second error degree value is obtained based on the second deviation values.

In an embodiment of the invention, the correction block has a rectangular shape. The correction touches are performed at four corners of the correction block, and the preset coordinate positions are positions of the four corners of the correction block. Here, $\Delta X1$ to $\Delta X4$ respectively represent the first deviation values in the first direction between the correction coordinate positions and the preset coordinate positions, and $\Delta Y1$ to $\Delta Y4$ respectively represent the second deviation values in the second direction between the correction coordinate positions and the preset coordinate positions. Equations for calculating the first error degree value $\text{Diff\_X}$ and the second error degree value $\text{Diff\_Y}$ are respectively as follows:

$$\text{Diff\_}X=|\Delta X1-\Delta X2|+|\Delta X1-\Delta X3|+|\Delta X1-\Delta X4|+|\Delta X2-\Delta X3|+|\Delta X2-\Delta X4|+|\Delta X3-\Delta X4|;$$

$$\text{Diff\_}Y=|\Delta Y1-\Delta Y2|+|\Delta Y1-\Delta Y3|+|\Delta Y1-\Delta Y4|+|\Delta Y2-\Delta Y3|+|\Delta Y2-\Delta Y4|+|\Delta Y3-\Delta Y4|.$$

In an embodiment of the invention, the preset threshold includes a first threshold and a second threshold. The step of determining whether the distortion error quantity is more than the preset threshold includes the following steps. Whether the first error degree value is greater than the first threshold is determined. Whether the second error degree value is greater than the second threshold is determined. If the first error degree value is greater than the first threshold, or if the second error degree value is greater than the second threshold, the correction block is divided into a plurality of divided correction blocks.

In an embodiment of the invention, if the distortion error quantity is more than the preset threshold, the following steps are further included: (a) the correction block is divided into M×N parts, and thereby, the divided correction blocks are obtained; and (b) the correction touches performed by the user within each divided correction block are re-detected, and thereby, the distortion error quantity of each divided correction block is calculated. As long as the distortion error quantity is more than the preset threshold, the steps (a) to (b) are repeated until the distortion error quantity of each divided correction block is less than or equal to the preset threshold.

In an embodiment of the invention, the correction method further includes the following steps. A touch behavior of the user is detected, and thereby, a system coordinate position of the touch behavior is obtained, wherein the system coordinate position is located at one location block among the correction block and the divided correction blocks. The correction parameter set corresponding to the location block is obtained. The system coordinate position is corrected based on the correction parameter set.

In an embodiment of the invention, the step of correcting the system coordinate position further includes the following steps. A plurality of weighting values are obtained based on distances between the system coordinate position and a plurality of sides of the location block where the system coordinate position is located. The system coordinate position is corrected according to the correction parameter set of the location block where the system coordinate position is located and the weighting values.

In an embodiment of the invention, the step of obtaining the weighting values based on the distances between the system coordinate position and the sides of the location block where the system coordinate position is located includes the following steps. Distance ratios between the system coordinate position and two opposite sides in the first direction are calculated. Distance ratios between the system coordinate position and another two opposite sides in the second direction are calculated. The weighting values are determined according to the distance ratios.

In an embodiment of the invention, the system coordinate position is (Tx, Ty), and a corrected coordinate position is (Tx+$\Delta$X, Ty+$\Delta$Y). Here, the distance ratios between the system coordinate position and the two opposite sides in the first direction are W1x:W3x and W2x:W4x. The distance ratios between the system coordinate position and the another two opposite sides in the second direction are W1y:W2y and W3y:W4y, wherein W1x+W3x=1 and W2x+W4x=1; and W1y+W2y=1 and W3y+W4y=1. Equations for calculating $\Delta$X and $\Delta$Y are:

$$\Delta X = [(\Delta X1 \times W3x + \Delta X3 \times W1x) \times W2y] + [(\Delta X2 \times W4x + \Delta X4 \times W2x) \times W1y];$$

$$\Delta Y = [(\Delta Y1 \times W2y + \Delta Y2 \times W1y) \times W3y] + [(\Delta Y3 \times W4y + \Delta Y4 \times W3y) \times W1x].$$

In an embodiment of the invention, the step of separately comparing the correction coordinate positions with the preset coordinate positions and thereby calculating the distortion error quantity includes the following steps. A first area is calculated according to the correction coordinate positions. A second area is calculated according to the preset coordinate positions. An absolute difference between the first area and the second area is calculated, so that the absolute difference is used as the distortion error quantity.

In an embodiment of the invention, the correction block has a rectangular shape, and before the step of detecting the correction touches performed by the user within the correction block, the following step is further included. A display screen is divided into M×N correction blocks, so that the distortion error quantity of each correction block is separately calculated.

The touch apparatus of the invention includes a display unit, a capturing unit and a control unit. The capturing unit is configured to capture an image of a touch object in front of the display unit. The control unit is coupled to the capturing unit. The control unit includes a position detection module, a correction calculation module and a position correction module. The correction method is achieved by means of the position detection module, the correction calculation module and the position correction module.

Based on the above, by dividing the display screen into a plurality of correction blocks, distortion of the correction blocks is reduced, and further, accuracy of a position after correction is improved.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF DISCLOSED EMBODIMENTS

Figure 1:
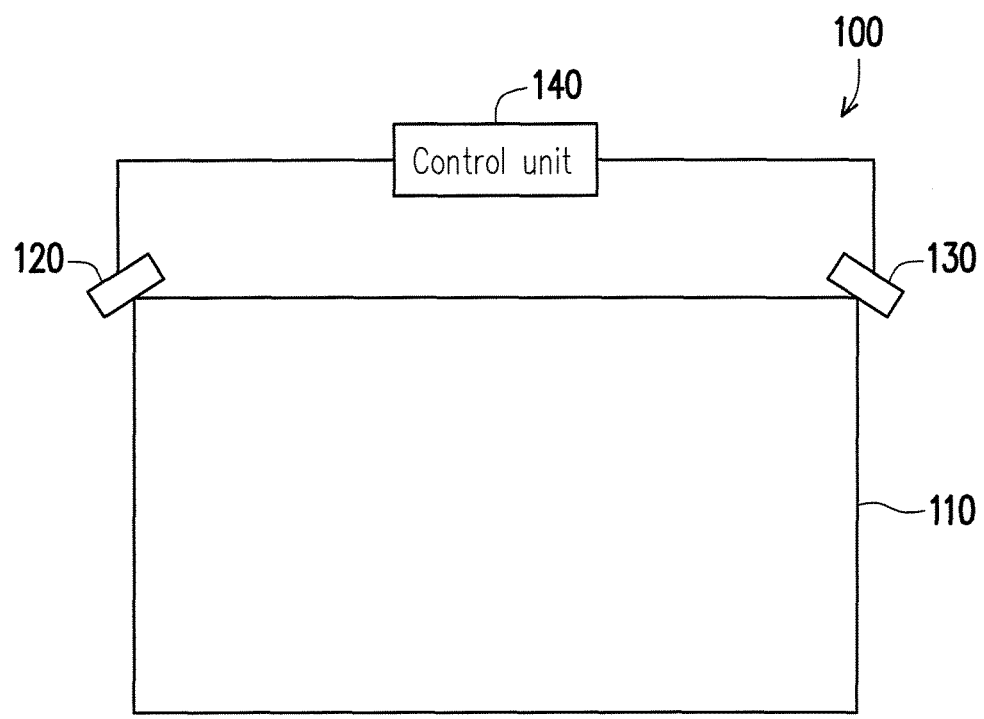
FIG. 1 is a schematic view of a touch apparatus according to an embodiment of the invention.

FIG. 1 is a schematic view of a touch apparatus according to an embodiment of the invention. Referring to FIG. 1, a touch apparatus 100 is, e.g., an optical touch apparatus, and includes a display unit 110, a capturing unit (including an imaging unit 120 and an imaging unit 130), and a control unit 140. Here, an example is described in which the capturing unit includes two imaging units 120 and 130. However, the invention is not limited thereto.

The display unit 110 is, e.g., a liquid-crystal display (LCD), a light-emitting diode (LED) display, a field emission display (FED) or other type of display. The display unit 110 is configured to display an operation screen so that a user may operate the displayed operation screen by using a touch object such as a finger, etc. The control unit 140 is coupled to a processor or controller of the display unit 110 through wire or wireless communication, so as to reflect a converted coordinate position onto the display unit 110. In other embodiments, the display unit 110 may be a screen for a projector, and the control unit 140 is coupled to the projector through wire or wireless communication.

The imaging units 120 and 130 are, e.g., optical lenses having a photosensitive element such as a charge-coupled device (CCD), a complementary metal-oxide-semiconductor (CMOS), etc. The imaging units 120 and 130 are disposed on the same side of the display unit 110 (e.g., disposed at left and right corners on an upper side of the display unit 110, as shown in FIG. 1) facing another side of the display unit 110 (e.g., facing the two opposite corners on a lower side, as shown in FIG. 1), and are configured to capture an image of the touch object (e.g., a finger or a touch pen, etc.) that performs an operation in front of the display unit 110.

The control unit 140 is, e.g., a central processing unit (CPU), a microprocessor, a digital signal processor (DSP), an application-specific integrated circuit (ASIC) or other similar device. The control unit 140 is coupled respectively to the imaging units 120 and 130, so as to receive and analyze the images captured by the imaging units 120 and 130, and further, to calculate a system coordinate position corresponding to a touch position touched by the touch object within the display unit 110. However, an error may occur between the touch position and the system coordinate position due to deviation of disposition positions of the imaging units 120 and 130.

Figure 2:
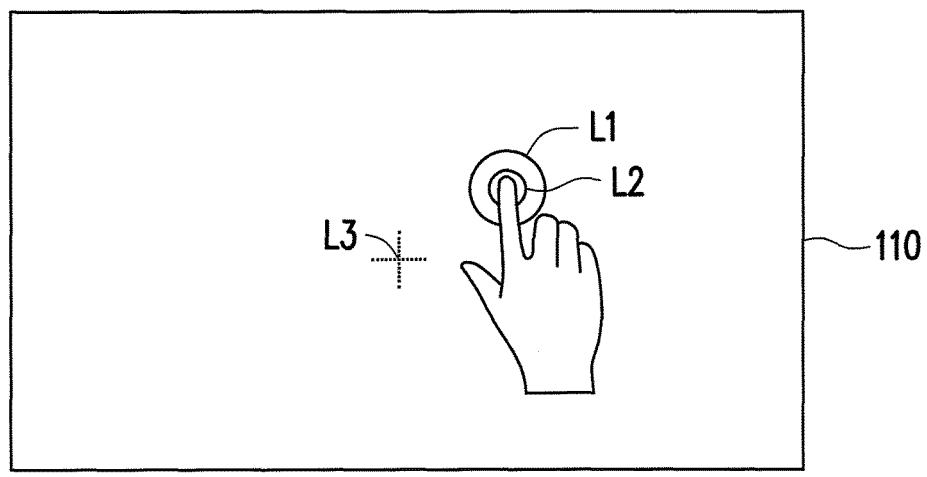
FIG. 2 is a schematic view of a touch position and a system coordinate position according to an embodiment of the invention.

For example, FIG. 2 is a schematic view of a touch position and a system coordinate position according to an embodiment of the invention. As shown in FIG. 2, the user uses a finger (or other touch object) to touch a display position L1 on the display unit 110, which thus provides a touch position L2. The control unit 140 further calculates a system coordinate position L3 corresponding to the touch position L2 by a triangulation method. Ideally, the touch position L2 should overlap the system coordinate position L3. Therefore, before use of the touch apparatus 100, a correction procedure is executed in advance so as to obtain a correction parameter set, and further, the later-calculated system coordinate position L3 is corrected based on the correction parameter set.

Figure 3:
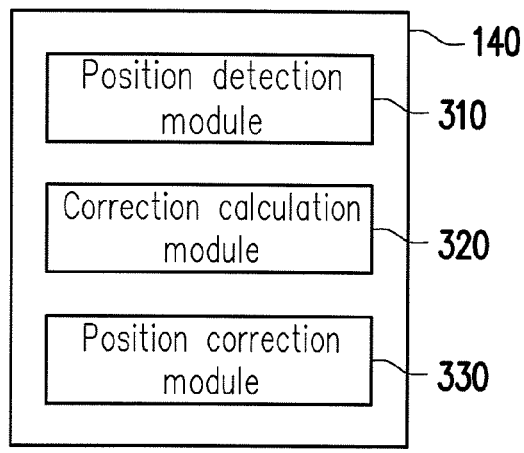
FIG. 3 is a block view of a control unit according to an embodiment of the invention.

FIG. 3 is a block view of a control unit according to an embodiment of the invention. In the present embodiment, the control unit 140 in FIG. 1 is further divided by function into a position detection module 310, a correction calculation module 320 and a position correction module 330.

The position detection module 310 is configured to analyze the images captured by the imaging units 120 and 130, so as to obtain a position touched by the touch object. In the correction procedure, a plurality of correction touches performed by the user within a correction block are detected by the imaging units 120 and 130, and thereby, the position detection module 310 obtains a plurality of correction coordinate positions. In an operation procedure, a touch behavior of the user is detected by the imaging units 120 and 130, and thereby, the position detection module 310 obtains a system coordinate position of the touch behavior.

In the correction procedure, the correction calculation module 320 calculates distortion error quantity of the correction block according to the correction touches performed by the user within the correction block, and determines whether the distortion error quantity is more than a preset threshold. If the distortion error quantity is more than the preset threshold, the correction calculation module 320 divides the correction block into a plurality of correction blocks, and through re-detection of the correction touches performed by the user within each of the plurality of divided correction blocks, the correction calculation module 320 calculates the distortion error quantity of each divided correction block. If the distortion error quantity is less than or equal to the preset threshold, the correction calculation module 320 obtains the correction parameter set of the correction block.

That is, as long as the distortion error quantity is more than the preset threshold, the correction calculation module 320 continues to divide the correction block into a plurality of divided correction blocks, and then re-calculates the distortion error quantity of each divided correction block until the distortion error quantity of each divided correction block is less than or equal to the preset threshold. Moreover, the correction calculation module 320 obtains the correction parameter set of the correction block that has the distortion error quantity less than or equal to the preset threshold.

In the operation procedure, the position correction module 330 executes correction for the touch behavior of the user through the touch object based on the correction parameter set. Hereinafter, steps of a correction method of the present embodiment are explained with reference to the elements shown in the aforementioned drawings.

Figure 4:
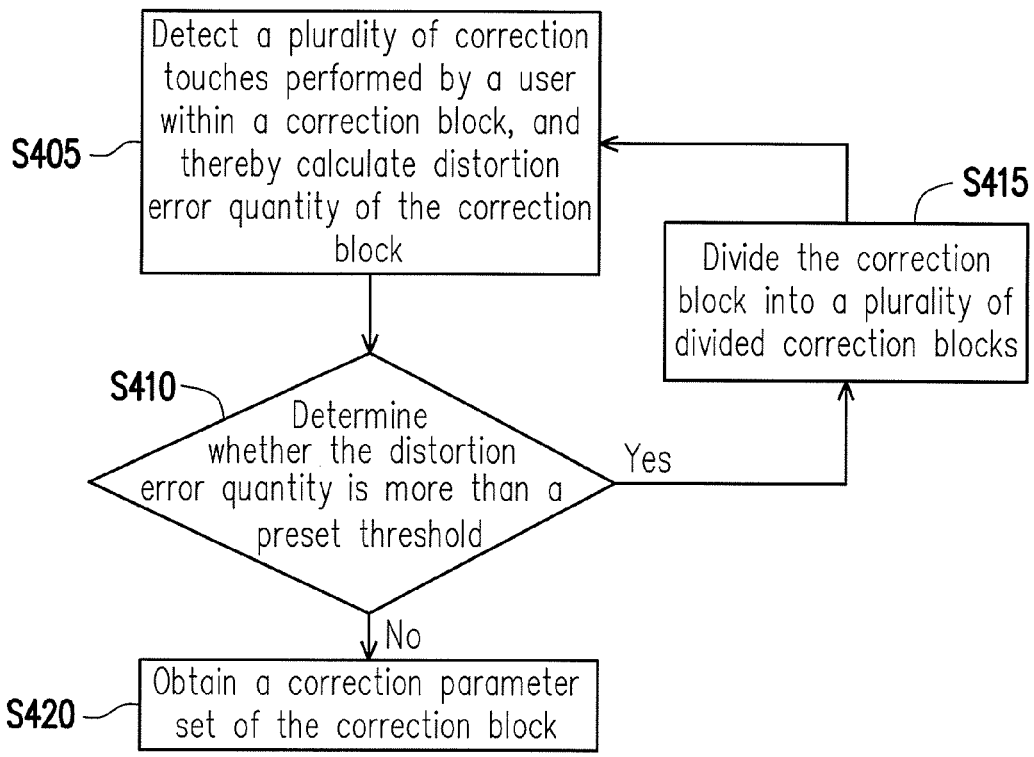
FIG. 4 is a flow chart of a correction method according to an embodiment of the invention.

FIG. 4 is a flow chart of a correction method according to an embodiment of the invention. Referring to FIGS. 1, 3 and 4, in step S405, a plurality of correction touches performed by the user within the correction block are detected by the imaging units 120 and 130, and thereby, the control unit 140 drives the position detection module 310 to calculate the distortion error quantity of the correction block.

Figure 5:
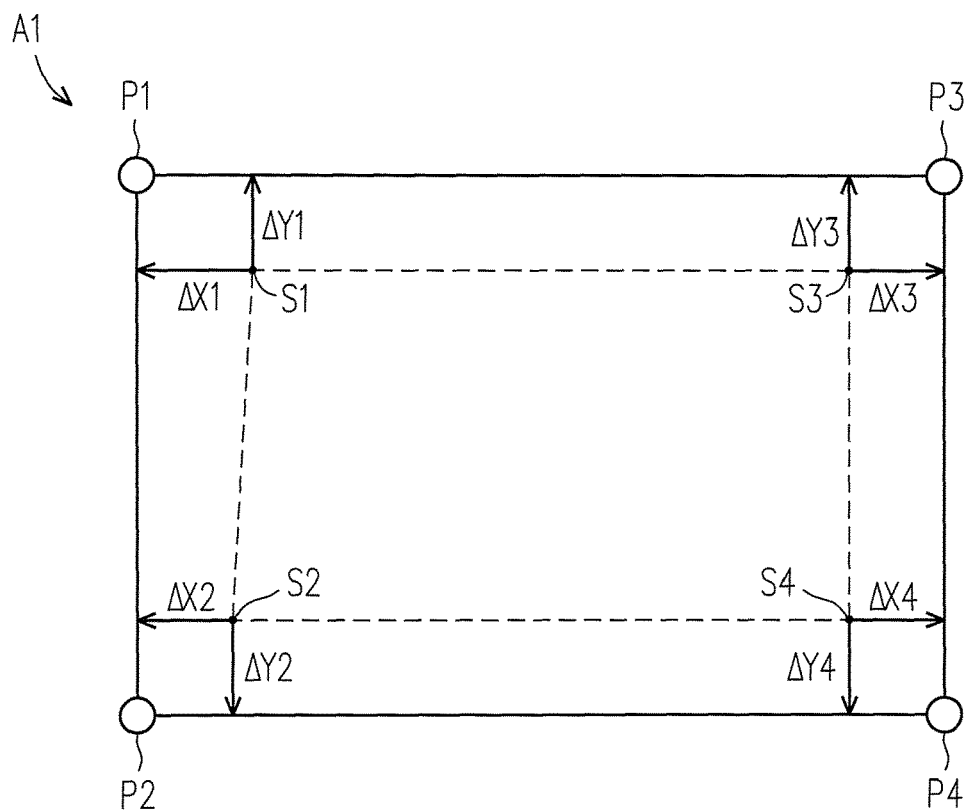
FIG. 5 is a schematic view of a correction block and correction points according to an embodiment of the invention.

Specifically, the control unit 140 determines a plurality of correction points within the correction block in advance so that the user performs the correction touches at the correction points. Moreover, the control unit 140 obtains a plurality of correction coordinate positions based on the plurality of correction touches performed by the user within the correction block. For example, FIG. 5 is a schematic view of a correction block and correction points according to an embodiment of the invention. In the present embodiment, an entire display screen of the display unit 110 is used as a correction block A1. In other embodiments, the entire display screen may be divided into a plurality of correction blocks A1 at the beginning, and then the distortion error quantity of each correction block A1 is calculated one by one.

In FIG. 5, the correction block A1 has a rectangular shape. The control unit 140 sets four corners of the correction block A1 as correction points in advance so as to use the positions of the correction points as preset coordinate positions P1 to P4. That is, the correction block A1 is a block surrounded by the preset coordinate positions P1 to P4. In the correction procedure, the user first uses a finger (or other touch object) to separately touch the four correction points within the correction block A1. Here, the control unit 140 gives a hint to the user to perform correction touches at the four corners of the display unit 110.

After the user touches the four correction points, the position detection module 310 calculates four correction coordinate positions S1 to S4. By separately comparing the correction coordinate positions S1 to S4 with the preset coordinate positions P1 to P4, the correction calculation module 320 calculates the distortion error quantity of the correction block A1.

Next, in step S410, the correction calculation module 320 determines whether the distortion error quantity is more than the preset threshold. If the distortion error quantity is more than the preset threshold, in step S415, the correction block is divided into a plurality of parts and then step S405 is executed again. That is, the correction touches performed by the user within each divided correction block are re-detected by the imaging units 120 and 130, and thereby, the correction calculation module 320 calculates the distortion error quantity of each divided correction block. Moreover, the correction calculation module 320 continues to divide the divided correction block that has the distortion error quantity more than the preset threshold into a plurality of parts until the distortion error quantity of each divided correction block is less than or equal to the preset threshold.

Figure 6:
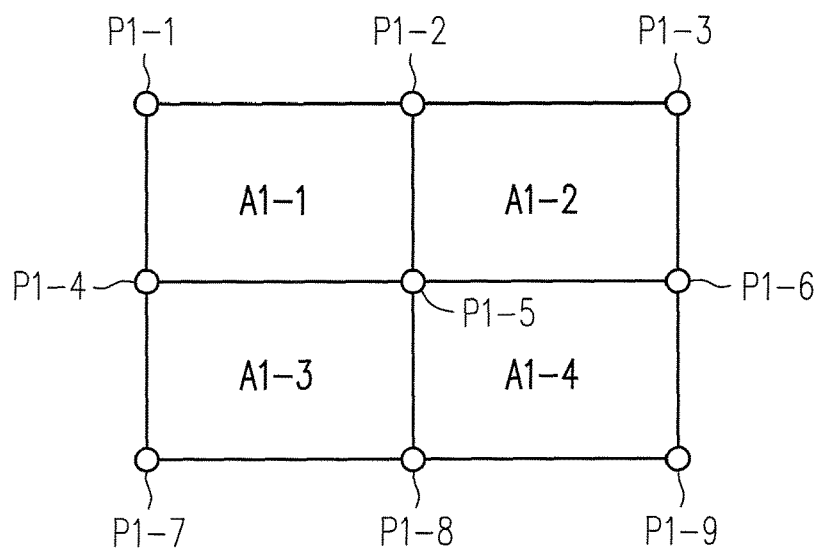
FIG. 6 is a schematic view of a correction block divided into a plurality of parts according to an embodiment of the invention.

With respect to the correction block A1 in FIG. 5, if the distortion error quantity of the correction block A1 is more than the preset threshold, it means that the correction block A1 has a too large error. Therefore, the correction calculation module 320 further divides the correction block A1 into a plurality of parts. For example, the correction block A1 is divided into M×N correction blocks, wherein M and N are positive integers greater than or equal to 1. For example, FIG. 6 is a schematic view of a correction block divided into a plurality of correction blocks according to an embodiment of the invention. In the present embodiment, the correction block A1 is divided into 2×2 parts, i.e., a correction block A1-1, a correction block A1-2, a correction block A1-3 and a correction block A1-4. However, in other embodiments, M may not be equal to N, and the correction block may be divided in a manner of 3×2, 2×3, 1×2, 2×1, etc. The invention is not limited thereto.

Referring to FIG. 6, after the correction calculation module 320 divides the correction block A1 into the correction blocks A1-1, A1-2, A1-3 and A1-4, the user is given a hint to perform touches at corners of the correction blocks A1-1, A1-2, A1-3 and A1-4. As shown in FIG. 6, since each two adjacent correction blocks share two corners with each other, the user may only touch at least 9 points (P1-1 to P1-9).

Referring back to FIG. 4, if the distortion error quantity of each correction block is less than or equal to the preset threshold, in step S420, the correction calculation module 320 obtains the correction parameter set of each correction block. For example, the correction parameter set includes: a plurality of first deviation values in a first direction between the correction coordinate positions and the preset coordinate positions, and a plurality of second deviation values in a second direction between the correction coordinate positions and the preset coordinate positions. Here, the first direction is, e.g., an X-axis direction, and the second direction is, e.g., a Y-axis direction.

Figure 7:
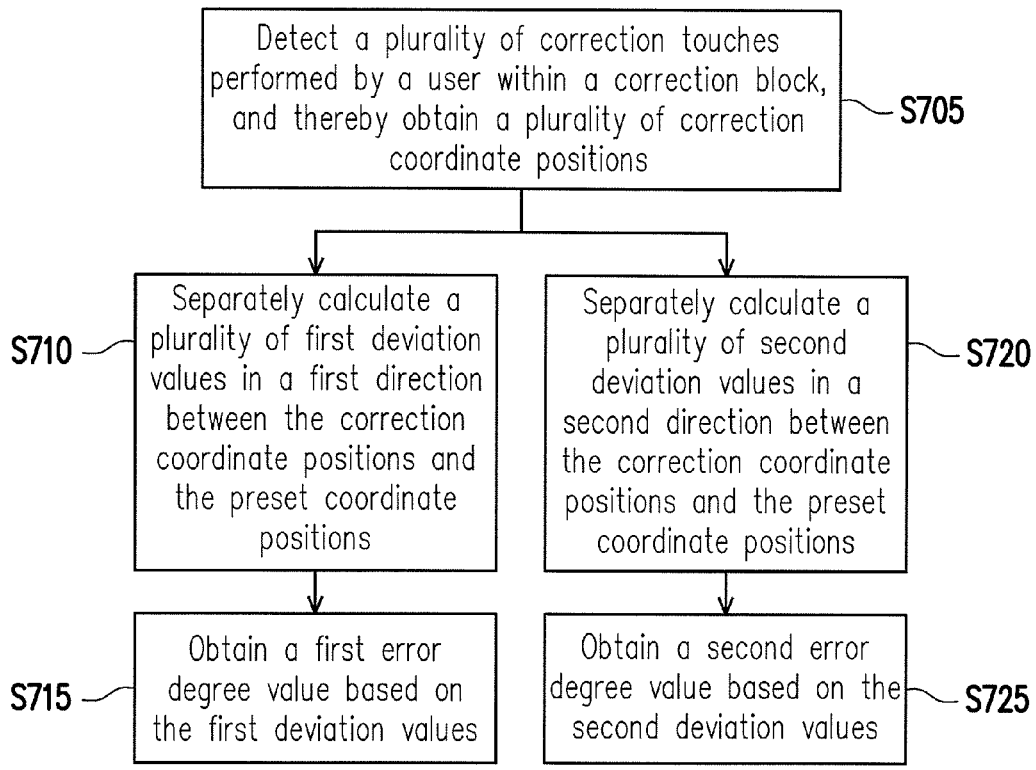
FIG. 7 is a flow chart of a method of calculating distortion error quantity according to an embodiment of the invention.
Figure 8:
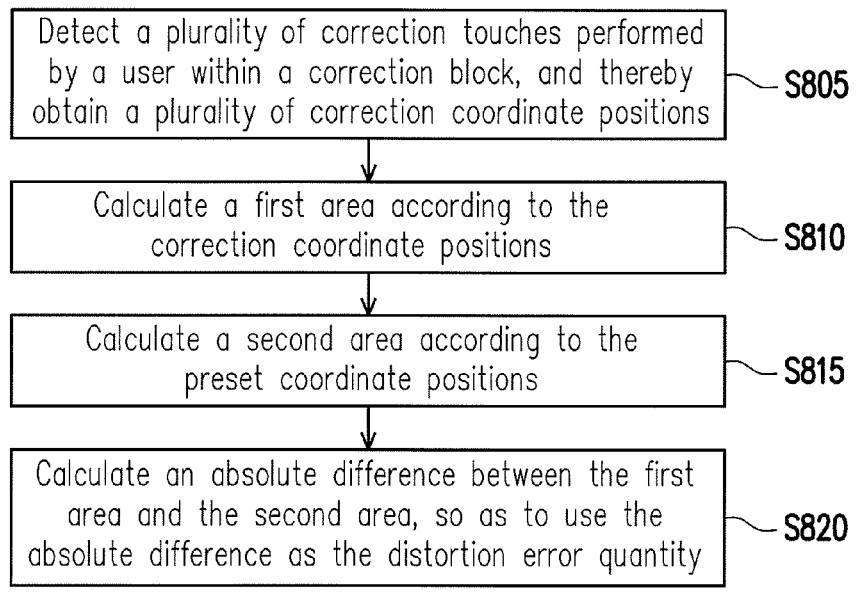
FIG. 8 is a flow chart of a method of calculating distortion error quantity according to another embodiment of the invention.

Hereinafter, a method of calculating the distortion error quantity is explained by examples. FIG. 7 is a flow chart of a method of calculating distortion error quantity according to an embodiment of the invention. FIG. 8 is a flow chart of a method of calculating distortion error quantity according to another embodiment of the invention.

The embodiment shown by FIG. 7 is a manner of implementing step S405, wherein error degrees in the X-axis direction and the Y-axis direction are respectively used as the distortion error quantity. That is, the distortion error quantity includes a first error degree value and a second error degree value. Here, the explanation is given with reference to FIG. 5.

Referring to FIGS. 5 and 7, in step S705, a plurality of correction touches performed by the user within the correction block A1 are detected by the imaging units 120 and 130, and thereby, the position detection module 310 obtains the correction coordinate positions S1 to S4.

Next, in step S710, the correction calculation module 320 separately calculates a plurality of first deviation values $\Delta X1$ to $\Delta X4$ in the first direction between the correction coordinate positions S1 to S4 and the preset coordinate positions P1 to P4. Meanwhile, in step S720, the correction calculation module 320 separately calculates a plurality of second deviation values $\Delta Y1$ to $\Delta Y4$ in the second direction between the correction coordinate positions S1 to S4 and the preset coordinate positions P1 to P4.

$\Delta X1$ and $\Delta Y1$ represent the deviation values respectively in the X-axis direction and the Y-axis direction between the preset coordinate position P1 and the correction coordinate position S1, and the rest may be understood in the same manner. Here, rightward and downward deviations are indicated by positive values, while leftward and upward deviations are indicated by negative values. That is, $\Delta X3$, $\Delta X4$, $\Delta Y2$ and $\Delta Y4$ are positive values, while $\Delta X1$, $\Delta X2$, $\Delta Y1$ and $\Delta Y3$ are negative values.

Next, in step S715, the correction calculation module 320 obtains the first error degree value based on the first deviation values. In step S725, the correction calculation module 320 obtains the second error degree value based on the second deviation values.

An equation for calculating the first error degree value Diff_X is:

$$\text{Diff\_}X = |\Delta X1 - \Delta X2| + |\Delta X1 - \Delta X3| + |\Delta X1 - \Delta X4| + |\Delta X2 - \Delta X3| + |\Delta X2 - \Delta X4| + |\Delta X3 - \Delta X4|.$$

An equation for calculating the second error degree value Diff_Y is:

$$\text{Diff\_}Y = |\Delta Y1 - \Delta Y2| + |\Delta Y1 - \Delta Y3| + |\Delta Y1 - \Delta Y4| + |\Delta Y2 - \Delta Y3| + |\Delta Y2 - \Delta Y4| + |\Delta Y3 - \Delta Y4|.$$

The main physical meaning of the above equations is that, according to deviation quantity at the four corners, relative distortion degree between each two corners is calculated and used as a basis for determining whether the distortion is too serious. In detail, the deviation values $\Delta X$ and $\Delta Y$ each include a numerical parameter and a direction parameter, and thus, all of them are substantially vectors. A difference of each two of the vectors represent a moving trend of two corners. For example, with respect to P1 to P4 and S1 to S4 in the X-axis direction, in a case where $\Delta X1$ is $-1$, $\Delta X2$ is $+5$, $\Delta X3$ is $+3$ and $\Delta X4$ is $+5$, in terms of the deviation value, since $\Delta X2$ and $\Delta X4$ both have a numerical value of 5, it can be considered that S2 at the lower left corner and S4 at the lower right corner have a greater distortion degree than P2 and P4. However, actually, the result of $|\Delta X1 - \Delta X3|$ is 4, and that is, with respect to S1 at the upper left corner and S3 at the upper right corner, a distance between P1 and P3 is increased by 4. The result of $|\Delta X2 - \Delta X4|$ is 0, and that is, S2 at the lower left corner and S4 at the lower right corner, only horizontally move relative to P2 and P4 without changing a distance between S2 and S4. Hence, the distortion degrees at S2 at the lower left corner and S4 at the lower right corner are smaller. Therefore, by obtaining a vector difference between each two deviation values, the distortion degree between two corners is obtained, and by adding up the distortion degrees, the error degree of the entire correction block is obtained.

Steps S705 to S725 are used as a manner of implementing step S405, and accordingly, in step S410 in FIG. 4, the preset threshold includes a first threshold and a second threshold. The correction calculation module 320 determines whether the first error degree value is greater than the first threshold and whether the second error degree value is greater than the second threshold. If the first error degree value is greater than the first threshold, or if the second error degree value is greater than the second threshold, step S415 is executed until the first error degree value is smaller than or equal to the first threshold and the second error degree value is smaller than or equal to the second threshold, and then step S420 is executed. That is, as long as the first error degree value is greater than the first threshold or the second error degree value is greater than the second threshold, the correction calculation module 320 determines that the distortion error quantity is more than the preset threshold ("Yes" in step S410). As long as the first error degree value is smaller than or equal to the first threshold and the second error degree value is smaller than or equal to the second threshold, the correction calculation module 320 determines that the distortion error quantity is not more than the preset threshold ("No" in step S410).

The embodiment shown by FIG. 8 is another manner of implementing step S405, wherein area similarity is used as the distortion error quantity. Here, the explanation is given with reference to FIG. 5. Referring to FIGS. 5 and 8, in step S805, a plurality of correction touches performed by the user within the correction block A1 are detected by the imaging units 120 and 130, and thereby, the position detection module 310 obtains the correction coordinate positions S1 to S4.

Next, in step S810, the correction calculation module 320 calculates a first area according to a quadrilateral surrounded by the correction coordinate positions S1 to S4. Meanwhile, in step S815, the correction calculation module 320 calculates a second area according to a quadrilateral surrounded by the preset coordinate positions P1 to P4. Here, the execution order of steps S810 and S815 is not limited, and steps S810 and S815 may also be executed concurrently. Then, in step S820, the correction calculation module 320 calculates an absolute difference (area similarity) between the first area and the second area, so that the absolute difference is used as the distortion error quantity. The greater the absolute difference, the less the area similarity, i.e., the greater the distortion degree. By contrast, the smaller the absolute difference, the more the area similarity, i.e., the smaller the distortion degree.

When the distortion error quantity of each divided correction block is less than or equal to the preset threshold, the correction procedure is completed. Thus, in the subsequent operation procedure, the position correction module 330 executes correction for the touch behavior of the user through the touch object based on the correction parameter set. In step S420, the correction calculation module 320 separately records the correction parameter sets of the correction blocks. Next, the operation procedure is started.

Figure 9:
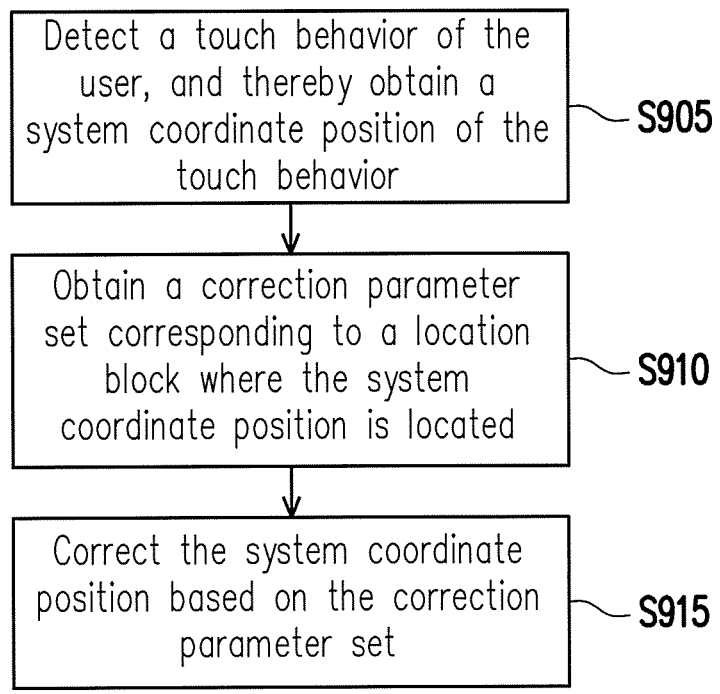
FIG. 9 is a flow chart of a correction method in an operation procedure according to an embodiment of the invention.

FIG. 9 is a flow chart of a correction method in an operation procedure according to an embodiment of the invention. Referring to FIGS. 1, 3 and 9, in step S905, the touch behavior of the user is detected by the imaging units 120 and 130, and thereby, the position detection module 310 obtains the system coordinate position of the touch behavior.

Next, in step S910, the position correction module 330 obtains a correction parameter set corresponding to a location block (one of the correction blocks) where the system coordinate position is located. In step S915, the position correction module 330 corrects the system coordinate position based on the obtained correction parameter set. For example, the position correction module 330 obtains a set of coordinate deviation quantity $\Delta X$ and $\Delta Y$ according to the correction parameter set, and adds the corresponding deviation quantity $\Delta X$ and $\Delta Y$ respectively to x and y coordinates of the system coordinate position, thereby obtaining the corrected coordinate position.

To improve the accuracy of the correction, in step S915, the position correction module 330 further obtains a plurality of weighting values based on distances between the system coordinate position and a plurality of sides of the location block where the system coordinate position is located, and further, corrects the system coordinate position according to the correction parameter set of the location block where the system coordinate position is located and the weighting values.

Figure 10:
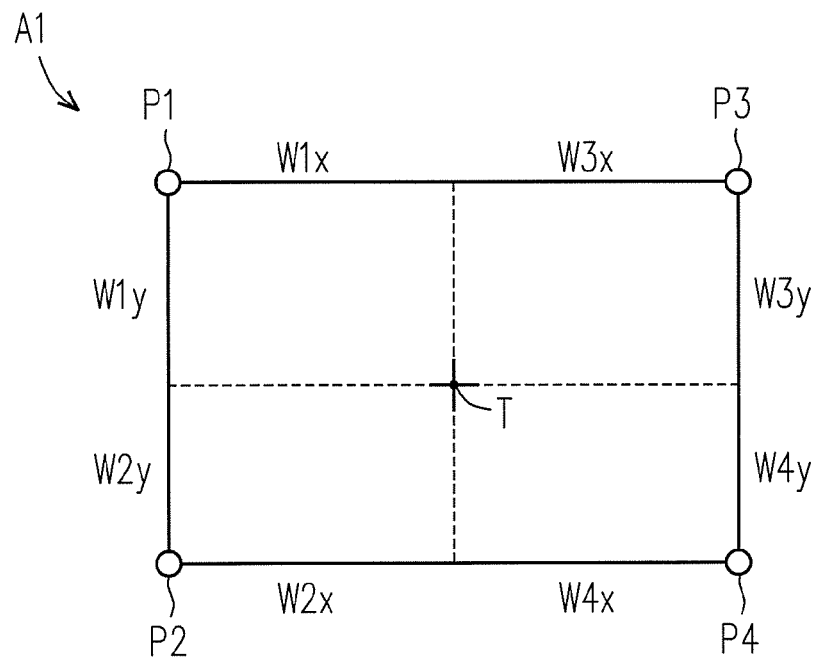
FIG. 10 is a schematic view of calculation of a distance ratio according to an embodiment of the invention.

FIG. 10 is a schematic view of calculation of a distance ratio according to an embodiment of the invention. Referring to FIG. 10, T is the system coordinate position obtained by calculation by the position detection module 310 according to images of the touch behavior captured by the imaging units 120 and 130, and T=(Tx, Ty). Here, it is assumed that the display screen has been divided into a plurality of correction blocks in the correction procedure. Moreover, according to steps S405 to S415, the display screen is not necessarily proportionally divided. Actually, the number of division of each correction block is determined depending on the distortion degree. In the operation procedure, after the position detection module 310 obtains the system coordinate position T, the position correction module 330 determines which correction block is the location block where the system coordinate position T is located, and reads the correction parameter set corresponding to the location block, i.e., the first deviation values $\Delta X1$ to $\Delta X4$ in the first direction and the second deviation values $\Delta Y1$ to $\Delta Y4$ in the second direction. Here, the explanation is given by taking the correction block A1 shown in FIG. 5 as the location block. The preset coordinate positions of the correction block A1 include P1, P2, P3 and P4.

The position correction module 330 obtains a plurality of weighting values based on distances between the system coordinate position T and a plurality of sides of the correction block A1 where the system coordinate position T is located. That is, the weighting values are calculated according to the preset coordinate positions P1, P2, P3 and P4 and the system coordinate position T. Specifically, the position correction module 330 calculates distance ratios between the system coordinate position T and two opposite sides in the first direction (e.g., the X-axis direction) and calculates distance ratios between the system coordinate position T and another two opposite sides in the second direction (e.g., the Y-axis direction), thereby determining the weighting values according to the distance ratios.

In detail, by separately comparing the x coordinate of the system coordinate position T with the x coordinates of the preset coordinate positions P1 and P3, a distance ratio of W1x:W3x in the X-axis direction is obtained. Moreover, by separately comparing the x coordinate of the system coordinate position T with the x coordinates of the preset coordinate positions P2 and P4, another distance ratio of W2x:W4x is obtained. Here, since the correction block A1 has a rectangular shape, W1x=W2x, W3x=W4x and W1x:W3x=W2x:W4x, wherein W1x+W3x=W2x+W4x=1.

In addition, by separately comparing the y coordinate of the system coordinate position T with the y coordinates of the preset coordinate positions P1 and P2, a distance ratio of W1y:W2y in the Y-axis direction is obtained. Moreover, by separately comparing the y coordinate of the system coordinate position T with the y coordinates of the preset coordinate positions P3 and P4, another distance ratio of W3y:W4y in the Y-axis direction is obtained. Here, since the correction block A1 has a rectangular shape, W1y=W3y, W2y=W4y and W1y:W2y=W3y:W4y, wherein W1y+W2y=W3y+W4y=1.

After the aforementioned distance ratios are obtained, the position correction module 330 obtains the weighting values W1x, W2x, W3x, W4x, W1y, W2y, W3y and W4y according to the distance ratios. Next, the position correction module 330 calculates coordinate quantity ΔX and ΔY for correcting the system coordinate position T according to the distance ratios and the correction parameter set (the first deviation values ΔX1 to ΔX4 and the second deviation values ΔY1 to ΔY4) of the correction block A1.

The equations for calculating ΔX and ΔY are:

$$\Delta X=[(\Delta X1 \times W3x + \Delta X3 \times W1x) \times W2y] + [(\Delta X2 \times W4x + \Delta X4 \times W2x) \times W1y];$$

$$\Delta Y=[(\Delta Y1 \times W2y + \Delta Y2 \times W1y) \times W3y] + [(\Delta Y3 \times W4y + \Delta Y4 \times W3y) \times W1x].$$

Finally, the position correction module 330 corrects the system coordinate position T (T=(Tx, Ty)) with ΔX and ΔY, so as to obtain the corrected coordinate position, i.e., (Tx+ΔX, Ty+ΔY). The principle behind the above equations for calculating ΔX and ΔY is that, the ratio relationships with respect to the system coordinate position T within the correction block A1 are obtained. Then, based on the weights between the system coordinate position T and the four correction points (i.e., the preset coordinate positions P1 to P4) of the correction block A1, by multiplying each of the weights by the deviation values of each of the correction points in the X-axis direction and the Y-axis direction, the coordinate quantity the system coordinate position T should deviate is obtained. Thereby, the error between the system coordinate position and the touch position is corrected.

Figure 11:
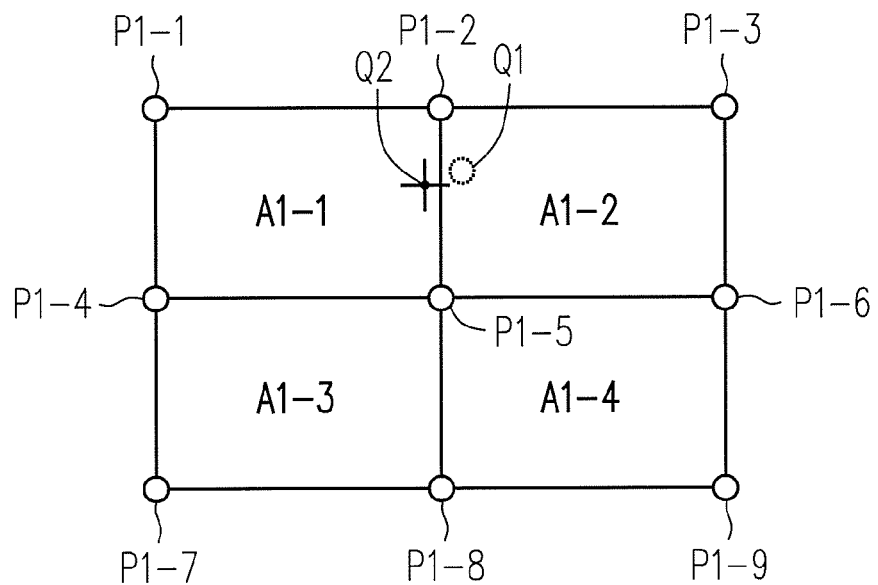
FIG. 11 is a schematic view of a relationship between a system coordinate position and a touch position according to an embodiment of the invention.

According to the concept of the weighting values between the system coordinate position and the correction points of the correction block, even if the touch position and the system coordinate position obtained by calculation exist at different correction blocks, the system coordinate position may be corrected to be close to the touch position. For example, FIG. 11 is a schematic view of a relationship between a system coordinate position and a touch position according to an embodiment of the invention. The present embodiment is explained by referring to the divided correction blocks shown in FIG. 6. In this case, a touch position Q1 where the user performs the touch behavior is located at the correction block A1-2, and a system coordinate position Q2 calculated by the control unit 140 is located at the correction block A1-1.

Even if the system coordinate position Q2 is located at the correction block A1-1, the system coordinate position Q2 is close to two of the correction points of the correction block A1-2, i.e., preset coordinate positions P1-2 and P1-5. Therefore, by calculating the coordinate quantity of deviation ΔX and ΔY by incorporating the concept of the weighting values, the system coordinate position Q2 is corrected to a position close to the touch position Q1 within the correction block A1-2.

In summary, in the correction procedure, whether to continue to divide the correction block is determined by calculating the distortion error quantity of the correction block, so as to make the distortion error quantity of each divided correction block is less than or equal to the preset threshold. Accordingly, the distortion of each correction block is reduced, and further, accuracy of the position after correction is improved. Then, in the operation procedure, the system coordinate position is corrected according to the correction parameter set of the correction block where the system coordinate position is located. Moreover, the concept of the weighting values between the system coordinate position and the correction points of the correction block is incorporated, so that even if the touch position and the system coordinate position obtained by calculation are located at different correction blocks, the system coordinate position may be corrected to be close to the touch position by the aforementioned method.

Although the invention has been described with reference to the above embodiments, it will be apparent to persons of ordinary skill in the art that modifications to the described embodiments may be made without departing from the spirit of the invention. Accordingly, the scope of the invention will be defined by the attached claims and not by the above detailed descriptions.

What is claimed is:

1. A correction method adapted for a touch apparatus, the correction method comprising:
  detecting a plurality of correction touches performed by a user within a correction block, thereby calculating a distortion error quantity of the correction block;
  determining whether the distortion error quantity is more than a preset threshold;
  when the distortion error quantity is more than the preset threshold, dividing the correction block into a plurality of divided correction blocks, and re-detecting the correction touches performed by the user within each of the divided correction blocks, thereby calculating the distortion error quantity of each of the divided correction blocks.

2. The correction method of claim 1, wherein the step of detecting the correction touches performed by the user within the correction block and thereby calculating the distortion error quantity of the correction block comprises:
  detecting the correction touches performed by the user within the correction block, thereby obtaining a plurality of correction coordinate positions; and
  separately comparing the correction coordinate positions with a plurality of preset coordinate positions, thereby calculating the distortion error quantity, wherein the correction block is a block surrounded by the preset coordinate positions.

3. The correction method of claim 2, wherein the distortion error quantity comprises a first error degree value and a second error degree value, and the correction parameter set comprises a plurality of first deviation values and a plurality of second deviation values,
  the step of separately comparing the correction coordinate positions with the preset coordinate positions and thereby calculating the distortion error quantity comprises:
  separately calculating the first deviation values in a first direction between the correction coordinate positions and the preset coordinate positions;
  separately calculating the second deviation values in a second direction between the correction coordinate positions and the preset coordinate positions;
  obtaining the first error degree value based on the first deviation values; and
  obtaining the second error degree value based on the second deviation values.

4. The correction method of claim 3, wherein the correction block has a rectangular shape, the correction touches are performed at four corners of the correction block, and the preset coordinate positions are positions of the four corners of the correction block, an equation for calculating the first error degree value is:

$$\text{Diff\_}X=|\Delta X1-\Delta X2|+|\Delta X1-\Delta X3|+|\Delta X1-\Delta X4|+|\Delta X2-\Delta X3|+|\Delta X2-\Delta X4|+|\Delta X3-\Delta X4|;$$

an equation for calculating the second error degree value is:

$$\text{Diff\_}Y=|\Delta Y1-\Delta Y2|+|\Delta Y1-\Delta Y3|+|\Delta Y1-\Delta Y4|+|\Delta Y2-\Delta Y3|+|\Delta Y2-\Delta Y4|+|\Delta Y3-\Delta Y4|;$$

wherein Diff_X is the first error degree value, and ΔX1 to ΔX4 are respectively the first deviation values in the first direction between the correction coordinate positions and the preset coordinate positions;

Diff_Y is the second error degree value, and ΔY1 to ΔY4 are respectively the second deviation values in the second direction between the correction coordinate positions and the preset coordinate positions.

5. The correction method of claim 3, wherein the preset threshold comprises a first threshold and a second threshold, the step of determining whether the distortion error quantity is more than the preset threshold comprises:
determining whether the first error degree value is greater than the first threshold; and
determining whether the second error degree value is greater than the second threshold,
wherein if the first error degree value is greater than the first threshold, or if the second error degree value is greater than the second threshold, dividing the correction block into the plurality of divided correction blocks.

6. The correction method of claim 1, wherein if the distortion error quantity is more than the preset threshold, the correction method further comprises:
(a) dividing the correction block into M×N parts, so as to obtain the divided correction blocks; and
(b) re-detecting the correction touches performed by the user within each of the divided correction blocks, thereby calculating the distortion error quantity of each of the divided correction blocks;
wherein as long as the distortion error quantity is more than the preset threshold, repeating the steps (a) to (b) until the distortion error quantity of each of the divided correction blocks is less than or equal to the preset threshold.

7. The correction method of claim 1, further comprising:
when the distortion error quantity is less than or equal to the preset threshold, obtaining a correction parameter set of the correction block, so as to execute correction for a touch behavior of the user based on the correction parameter set;
detecting the touch behavior of the user, thereby obtaining a system coordinate position of the touch behavior, wherein the system coordinate position is located at one location block among the correction block and the divided correction blocks;
obtaining the correction parameter set corresponding to the location block; and
correcting the system coordinate position based on the correction parameter set.

8. The correction method of claim 7, wherein the step of correcting the system coordinate position further comprises:
obtaining a plurality of weighting values based on distances between the system coordinate position and a plurality of sides of the location block where the system coordinate position is located; and
correcting the system coordinate position according to the correction parameter set of the location block where the system coordinate position is located and the weighting values.

9. The correction method of claim 8, wherein the step of obtaining the weighting values based on the distances between the system coordinate position and the sides of the location block where the system coordinate position is located comprises:
calculating distance ratios between the system coordinate position and two opposite sides in a first direction;
calculating distance ratios between the system coordinate position and another two opposite sides in a second direction; and
determining the weighting values according to the distance ratios.

10. The correction method of claim 9, wherein the system coordinate position is (Tx, Ty), a corrected coordinate position is (Tx+ΔX, Ty+ΔY), and equations for calculating ΔX and ΔY are:

$$\Delta X=[(\Delta X1\times W3x+\Delta X3\times W1x)\times W2y]+[(\Delta X2\times W4x+\Delta X4\times W2x)\times W1y];$$

$$\Delta Y=[(\Delta Y1\times W2y+\Delta Y2\times W1y)\times W3y]+[(\Delta Y3\times W4y+\Delta Y4\times W3y)\times W1x];$$

wherein the correction parameter set comprises ΔX1 to ΔX4 and ΔY1 to ΔY4, ΔX1 to ΔX4 respectively representing a plurality of first deviation values in the first direction between a plurality of correction coordinate positions obtained based on the correction touches performed by the user within the location block and a plurality of preset coordinate positions, ΔY1 to ΔY4 respectively representing a plurality of second deviation values in the second direction between the correction coordinate positions and the preset coordinate positions,
the distance ratio between the system coordinate position and the two opposite sides in the first direction are W1x:W3x and W2x:W4x, wherein W1 x+W3x=W2x+W4x=1;
the distance ratio between the system coordinate position and the another two opposite sides in the second direction are W1y:W2y and W3y:W4y, wherein W1y+W2 W3 y+W4y=1.

11. The correction method of claim 2, wherein the step of separately comparing the correction coordinate positions with the preset coordinate positions and thereby calculating the distortion error quantity comprises:
calculating a first area according to the correction coordinate positions;
calculating a second area according to the preset coordinate positions; and
calculating an absolute difference between the first area and the second area so as to use the absolute difference as the distortion error quantity.

12. The correction method of claim 1, wherein the correction block has a rectangular shape, and before the step of detecting the correction touches performed by the user within the correction block, the correction method further comprises:
dividing a display screen into M×N of the correction blocks, so as to separately calculate the distortion error quantity of each of the correction blocks.

13. The correction method of claim 1, wherein the touch apparatus is an optical touch apparatus.

14. A touch apparatus, comprising:
a display unit;
a capturing unit, obtaining an image of a touch object in front of the display unit; and
a control unit, coupled to the capturing unit, comprising:
a position detection module, analyzing the image obtained by the capturing unit, thereby obtaining a plurality of positions corresponding to a plurality of correction touches performed by a user through the touch object within a correction block;
a correction calculation module, in a correction procedure, calculating a distortion error quantity of the correction block according to the correction touches performed by the user within the correction block, and determining whether the distortion error quantity is more than a preset threshold, when the distortion error quantity is more than the preset threshold, dividing the correction block into a plurality of divided correction blocks, and re-detecting the correction touches performed by the user within each of the divided correction blocks and thereby calculating the distortion error quantity of each of the divided correction blocks, and if the distortion error quantity is less than or equal to the preset threshold, obtaining a correction parameter set of the correction block; and
a position correction module, executing correction for a touch behavior of the user through the touch object based on the correction parameter set in an operation procedure.

15. The touch apparatus of claim 14, wherein the distortion error quantity comprises a first error degree value and a second error degree value, the correction parameter set comprises a plurality of first deviation values and a plurality of second deviation values, and the preset threshold comprises a first threshold and a second threshold,
the position detection module detects the correction touches performed by the user within the correction block, thereby obtaining a plurality of correction coordinate positions, wherein the correction block is a block surrounded by a plurality of preset coordinate positions;
the correction calculation module separately calculates the first deviation values in a first direction and the second deviation values in a second direction between the correction coordinate positions and the preset coordinate positions, obtains the first error degree value and the second error degree value respectively based on the first deviation values and the second deviation values, and determines whether the first error degree value is greater than the first threshold and whether the second error degree value is greater than the second threshold,
as long as the first error degree value is greater than the first threshold or the second error degree value is greater than the second threshold, the correction calculation module determines that the distortion error quantity is more than the preset threshold.

16. The touch apparatus of claim 14, wherein
(a) as long as the distortion error quantity is more than the preset threshold, the correction calculation module divides the correction block into M×N parts, thereby obtaining the divided correction blocks;
(b) the position detection module re-detects the correction touches performed by the user within each of the divided correction blocks, so that the correction calculation module calculates the distortion error quantity of each of the divided correction blocks;
as long as the distortion error quantity is more than the preset threshold, the correction calculation module and the position detection module repeat the steps (a) to (b) until the distortion error quantity of each of the divided correction blocks is less than or equal to the preset threshold.

17. The touch apparatus of claim 14, wherein
in the correction procedure, when the distortion error quantity is less than or equal to the preset threshold, obtaining a correction parameter set of the correction block;
in the operation procedure, the position detection module detects the touch behavior of the user, thereby obtaining a system coordinate position of the touch behavior, wherein the system coordinate position is located at one location block among the correction block and the divided correction blocks;
the position correction module obtains the correction parameter set corresponding to the location block and corrects the system coordinate position based on the correction parameter set.

18. The touch apparatus of claim 17, wherein the position correction module obtains a plurality of weighting values based on distances between the system coordinate position and a plurality of sides of the location block where the system coordinate position is located, and corrects the system coordinate position according to the correction parameter set of the location block where the system coordinate position is located and the weighting values,
wherein the position correction module calculates distance ratios between the system coordinate position and two opposite sides in a first direction and calculates distance ratios between the system coordinate position and another two opposite sides in a second direction, thereby determining the weighting values according to the distance ratios.

19. The touch apparatus of claim 14, wherein the correction calculation module calculates a first area according to a plurality of correction coordinate positions corresponding to the correction touches, calculates a second area according to a plurality of preset coordinate positions comprised in the correction block, and calculates an absolute difference between the first area and the second area so as to use the absolute difference as the distortion error quantity.

20. The touch apparatus of claim 14, wherein the correction calculation module divides a display screen into M×N of the correction blocks, so as to separately calculate the distortion error quantity of each of the correction blocks.

* * * * *